UNITED STATES PATENT OFFICE.

ANDREW NELSON, OF NEW YORK, N. Y.

COMPOSITION FOR TREATING FLOORS.

1,282,706.　　　　　　　Specification of Letters Patent.　　Patented Oct. 22, 1918.

No Drawing.　　　Application filed February 8, 1917. Serial No. 147,443.

*To all whom it may concern:*

Be it known that I, ANDREW NELSON, a citizen of the United States, residing at New York, in the county of New York and State of New York, have invented certain new and useful Improvements in Compositions for Treating Floors; and I do hereby declare the following to be a full, clear, and exact description of the invention, such as will enable others skilled in the art to which it appertains to make and use the same.

This invention relates to treatment of composition floors and material therefor, and has for an object to provide a material to give composition floors a polish or finish, and at the same time to "kill" the excretions known in the trade as "bloom" consisting of certain salts exuding from the composition floors which discolor such floors.

It is well known that composition floors of various composite materials after being laid are subject to discoloration owing to certain chemical changes resulting therein manifest by the appearance on the surface of white spots. In floors of various colors such as are usually laid the appearance of such white spots is very objectionable. The present invention is therefore directed to provide a material for overcoming such white spots, restoring the composition to its natural color, and at the same time providing a gloss finish such as ordinary floor-wax finish will produce.

In the preparation of one gallon of the material $\frac{4}{5}$ of a gallon of turpentine is employed, or if it is desired to make the material dry more quickly $\frac{2}{5}$ of a gallon of turpentine and $\frac{2}{5}$ of a gallon of benzin. The turpentine is put into a kettle and raised to boiling point, and while in such boiling condition $\frac{1}{2}$ pound of carnauba wax is introduced, together with 1 pound of paraffin wax, and $\frac{1}{4}$ pound of rosin. The material is maintained at such boiling point until the wax and rosin are wholly and thoroughly dissolved and commingled with the turpentine. If no benzin is employed, the material is now removed from the heat and permitted to cool, whereupon the material is complete; but if benzin is employed, the material is removed from the heat and after being removed the benzin is introduced with agitation, and after being thoroughly stirred and agitated the material is complete.

When cooled to normal condition, the material is of the consistency of thick cream or soft butter. The material is colored any color desired to correspond to the color of the composition floor to be treated, or is left uncolored if uncolored composition or cement floors are to be treated. In other words, as commercially employed various colors are marketed for the treatment of various colored or uncolored floors.

The material is applied to the floors in any of several ways, the rudimentary manner being to dip a cloth or rag into the creamy material and simply rub the material upon the surface of the floor. After this is spread evenly and thinly upon the floor the volatile solvent is permitted to evaporate so that the waxy material remains spread. In this condition the material is as efficient in killing the excretions as otherwise, but for appearances' sake the material is preferably polished by friction by the use of a brush or another rag lending a high polish to the surface.

What I claim as new is:—

1. A material for treating composition floors, consisting of carnauba wax, paraffin wax, rosin, turpentine and benzin, commingled to form a creamy substance.

2. A material for treating composition floors consisting, for one gallon, of carnauba wax $\frac{1}{2}$ pound, paraffin wax 1 pound, rosin $\frac{1}{4}$ pound, dissolved in turpentine under heat $\frac{2}{5}$ gallons, and $\frac{2}{5}$ gallons benzin added after removing from the heat.

In testimony whereof I affix my signature.

ANDREW NELSON.